(12) United States Patent
Miyata et al.

(10) Patent No.: US 11,227,302 B2
(45) Date of Patent: Jan. 18, 2022

(54) CODE READING DEVICE, METHOD, AND PROGRAM

(71) Applicant: NEC Platforms, Ltd., Kawasaki (JP)

(72) Inventors: Kotaro Miyata, Kanagawa (JP); Hideo Yokoi, Kanagawa (JP); Motoko Umeta, Kanagawa (JP); Takuro Nagano, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 33 days.

(21) Appl. No.: 16/604,228

(22) PCT Filed: Apr. 13, 2018

(86) PCT No.: PCT/JP2018/015481
§ 371 (c)(1),
(2) Date: Oct. 10, 2019

(87) PCT Pub. No.: WO2018/190410
PCT Pub. Date: Oct. 18, 2018

(65) Prior Publication Data
US 2020/0160370 A1 May 21, 2020

(30) Foreign Application Priority Data

Apr. 13, 2017 (JP) .............................. JP2017-079512

(51) Int. Cl.
*G06Q 30/02* (2012.01)
*G06Q 20/20* (2012.01)
*G06K 19/06* (2006.01)

(52) U.S. Cl.
CPC ..... *G06Q 30/0238* (2013.01); *G06K 19/0614* (2013.01); *G06Q 20/201* (2013.01);
(Continued)

(58) Field of Classification Search
CPC . G06Q 30/0207–0277; G06Q 30/0238; G06Q 20/208; G06K 7/12; G06K 7/10732
See application file for complete search history.

(56) References Cited

U.S. PATENT DOCUMENTS 8,577,729 B2    11/2013  Iizaka et al.
10,783,601 B1 *  9/2020  Rodriguez ............ G06T 1/0021
(Continued)

FOREIGN PATENT DOCUMENTS

CN    107944315 A  *  4/2018  ......... G06K 7/10881
JP    2002-024756 A   1/2002
(Continued)

OTHER PUBLICATIONS

International Search Report for PCT Application No. PCT/JP2018/015481, dated May 29, 2018.
(Continued)

*Primary Examiner* — David J Stoltenberg
*Assistant Examiner* — Michael J Cross
(74) *Attorney, Agent, or Firm* — Sughrue Mion, PLLC

(57) ABSTRACT

A POS terminal (code reading device) according to one example embodiment of the present invention includes: a code reading unit that reads information of a code based on a reflected light from the code attached to an item; and a discount processing unit that makes a discount of the item when the information of the code is not read by using a first light being irradiated on the code and the information of the code is read by using a second light being irradiated on the code, wherein the second light is different from the first light.

9 Claims, 17 Drawing Sheets

(52) U.S. Cl.
CPC ....... *G06Q 20/208* (2013.01); *G06Q 30/0235* (2013.01); *G06K 2019/06225* (2013.01)

(56) References Cited

U.S. PATENT DOCUMENTS

| | | | | |
|---|---|---|---|---|
| 2010/0213259 A1* | 8/2010 | Gao | ...................... | G06K 7/1096 235/469 |
| 2011/0239508 A1* | 10/2011 | Honda | ...................... | G09F 3/10 40/638 |
| 2012/0248184 A1* | 10/2012 | Naito | ................. | G06K 7/10732 235/383 |
| 2012/0274775 A1* | 11/2012 | Reiffel | ................... | G06Q 30/08 348/158 |
| 2015/0347889 A1* | 12/2015 | Nosaka | ................ | G06K 7/1439 726/7 |
| 2016/0092760 A1* | 3/2016 | Tanaka | ............. | G06K 19/06037 382/180 |
| 2020/0074895 A1* | 3/2020 | Liang | ................... | G02B 6/0076 |

FOREIGN PATENT DOCUMENTS

| | | | |
|---|---|---|---|
| JP | 2006-330673 | A | 12/2006 |
| JP | 2008-164819 | A | 7/2008 |
| JP | 2009-098494 | A | 5/2009 |
| JP | 2010-145465 | A | 7/2010 |
| JP | 2011197856 | A * | 10/2011 |
| JP | 2012-043175 | A | 3/2012 |
| JP | 2012-098943 | A | 5/2012 |
| JP | 2013-225331 | A | 10/2013 |
| JP | 2013-228816 | A | 11/2013 |
| JP | 2015-084199 | A | 4/2015 |
| JP | 2015-184780 | A | 10/2015 |
| JP | 2015-210612 | A | 11/2015 |

OTHER PUBLICATIONS

Japanese Office Action for JP Application No. 2017-079512 dated Jan. 30, 2019 with English Translation.
Indian Office Action for IN Application No. 201917038988 dated Jun. 28, 2021.

* cited by examiner

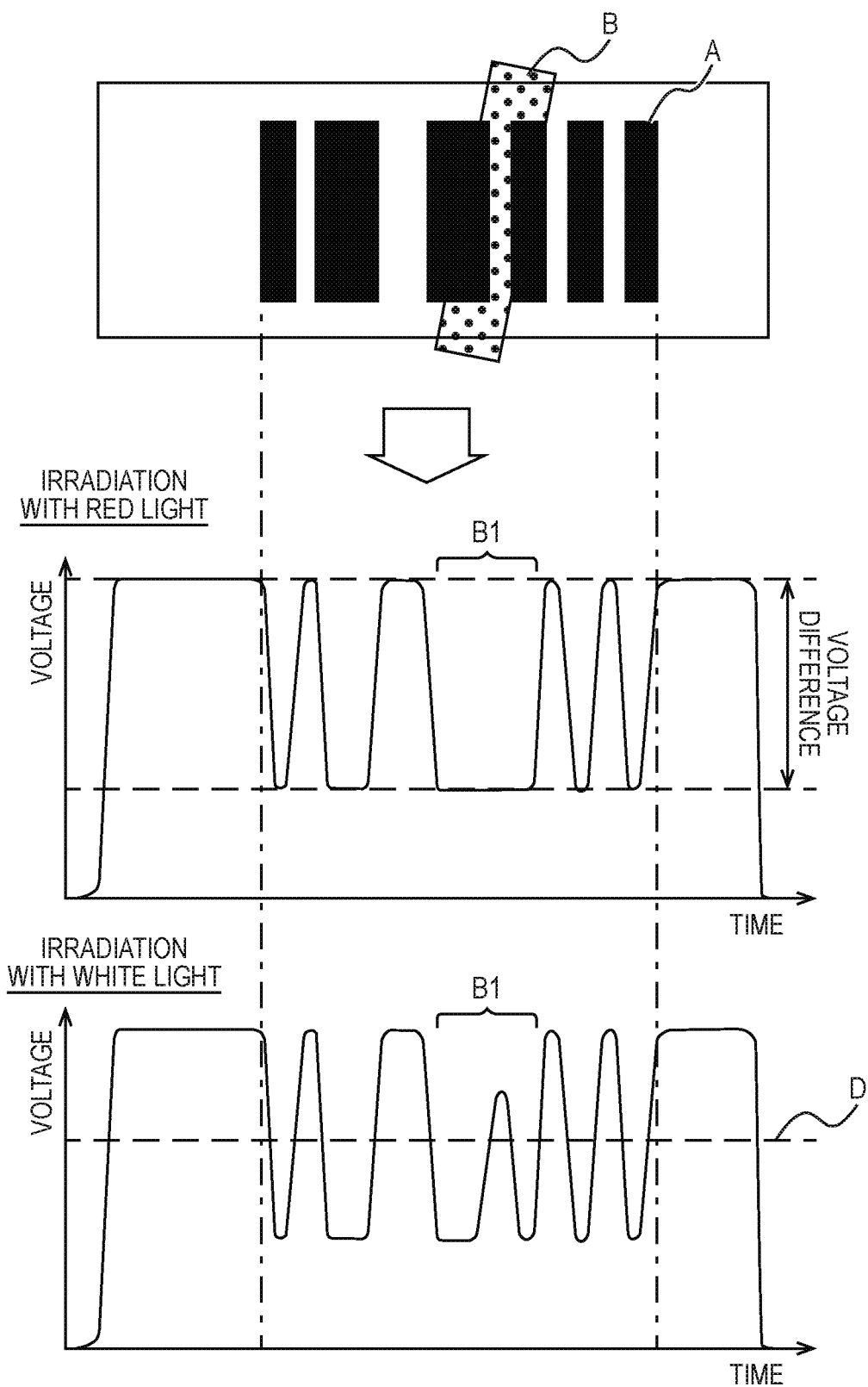

FIG. 10

| LINE COLOR | LIGHT COLOR | | | |
|---|---|---|---|---|
| | WHITE | GREEN | BLUE | RED |
| NO LINE | ○ | ○ | ○ | ○ |
| GREEN | ○ | ○ | × | × |
| BLUE | ○ | × | ○ | × |
| RED | ○ | × | × | ○ |

FIG. 13A

| Item code | Item name | Price | Discount |
|---|---|---|---|
| 2781000000006 | Cucumber | 100 Yen | ○ |
| 2782000000003 | Bell pepper | 150 Yen | × |
| ... | | | |

FIG. 13B

| Item code | Item name | Price | Time range | | | | | | | | | | | |
|---|---|---|---|---|---|---|---|---|---|---|---|---|---|---|
| | | | 10 | 11 | 12 | 13 | 14 | 15 | 16 | 17 | 18 | 19 | 20 | 21 |
| 2783000000000 | Crab salad | 198 Yen | × | × | × | × | × | × | × | × | ○ | ○ | ○ | ○ |
| 2784000000007 | Fried Oyster | 298 Yen | × | × | × | ○ | ○ | × | × | × | ○ | ○ | ○ | ○ |
| 2785000000004 | Potato salad | 148 Yen | ○ | × | × | × | × | × | × | × | × | × | × | × |
| 2786000000001 | Goyachanpuru | 398 Yen | × | × | × | × | × | × | × | × | × | ○ | ○ | ○ |
| ... | | | | | | | | | | | | | | | |

FIG. 16A

| Item code | Item name | Price | Discount |
|---|---|---|---|
| 2781000000006 | Cucumber | 100 Yen | 50 |
| 2782000000003 | Bell pepper | 150 Yen | 0 |
| ... | | | |

FIG. 16B

| Item code | Item name | Price | Time range | | | | | | | | | | | |
|---|---|---|---|---|---|---|---|---|---|---|---|---|---|---|
| | | | 10 | 11 | 12 | 13 | 14 | 15 | 16 | 17 | 18 | 19 | 20 | 21 |
| 2783000000000 | Crab salad | 198 Yen | 0 | 0 | 0 | 0 | 0 | 0 | 0 | 0 | 20 | 20 | 20 | 50 |
| 2784000000007 | Fried Oyster | 298 Yen | 0 | 0 | 0 | 10 | 20 | 0 | 0 | 0 | 10 | 10 | 30 | 20 |
| 2785000000004 | Potato salad | 148 Yen | 0 | 0 | 0 | 0 | 0 | 0 | 0 | 0 | 0 | 0 | 0 | 0 |
| 2786000000001 | Goyachanpuru | 398 Yen | 50 | 0 | 0 | 0 | 0 | 0 | 0 | 0 | 0 | 0 | 30 | 50 |
| ... | | | | | | | | | | | | | | | |

CODE READING DEVICE, METHOD, AND PROGRAM

This application is a National Stage Entry of PCT/JP2018/015481 filed on Apr. 13, 2018, which claims priority from Japanese Patent Application 2017-079512 filed on Apr. 13, 2017, the contents of all of which are incorporated herein by reference, in their entirety.

TECHNICAL FIELD

The present invention relates to a code reading device, a code reading method, and a code reading program used for reading a code attached to an item in a shop.

BACKGROUND ART

Conventionally, in a shop, a seal indicating a discount rate such as "30% discount" or a discount price such as "100 Yen discount" is attached to an item for discount, and a discount process is performed by a shop assistant manually inputting the discount rate or the discount price, which is indicated by the seal, to a Point of Sales (POS) terminal (also referred to as a register) at check.

Further, Patent Literature 1 discloses a technique of printing a label including a barcode indicating a discount rate or a discount price and a reason for discount and attaching the printed label to an item. The POS terminal performs a discount process by reading the barcode and acquiring the discount rate or the discount price.

CITATION LIST

Patent Literature

PTL 1: Japanese Patent Application Laid-Open No. 2013-228816

SUMMARY OF INVENTION

Technical Problem

In a method in which a shop assistant manually inputs a discount rate or a discount price indicated by a seal, there is a problem of the shop assistant overlooking the seal or making a mistake in entry of the discount rate or the discount price.

The technique disclosed in Patent Literature 1 requires a device that prints a label for discount and thus is costly. Further, it takes time because a label is attached to an item after waiting for completion of printing.

The present invention has been made in view of the problems described above and intends to provide a code reading device, a code reading method, and a code reading program that can attach discount information to an item at low cost and automatically acquire the discount information attached to the item.

Solution to Problem

A first aspect of the present invention is a code reading device including: a reading unit that reads information of a code based on a reflected light from the code attached to an item; and a processing unit that makes a discount of the item when the information of the code is not read by using a first light being irradiated on the code and the information of the code is read by using a second light being irradiated on the code, wherein the second light is different from the first light.

A second aspect of the present invention is a code reading method including: reading information of a code based on a reflected light from the code attached to an item; and making a discount of the item when the information of the code is not read by using a first light being irradiated on the code and the information of the code is read by using a second light being irradiated on the code, wherein the second light is different from the first light.

A third aspect of the present invention is a code reading program that causes a computer to perform: reading information of a code based on a reflected light from the code attached to an item; and making a discount of the item when the information of the code is not read by using a first light being irradiated on the code and the information of the code is read by using a second light being irradiated on the code, wherein the second light is different from the first light.

Advantageous Effects of Invention

According to the present invention, discount information can be attached to an item at low cost, and the discount information attached to the item can be automatically acquired.

BRIEF DESCRIPTION OF DRAWINGS

FIG. 8 is a diagram illustrating a graph of the light reception intensity resulted by the code reading method according to the first example embodiment.

FIG. 10 is a diagram illustrating a table as to whether or not reading is successful for each combination of colors of a discount line and colors of a light used in reading.

FIG. 13A is a schematic diagram of item information stored in a PLU server according to a fourth example embodiment.

FIG. 13B is a schematic diagram of item information stored in the PLU server according to the fourth example embodiment.

FIG. 16A is a schematic diagram of item information stored in a PLU server according to a fifth example embodiment.

FIG. 16B is a schematic diagram of item information stored in the PLU server according to the fifth example embodiment.

DESCRIPTION OF EMBODIMENTS

Figure 1:
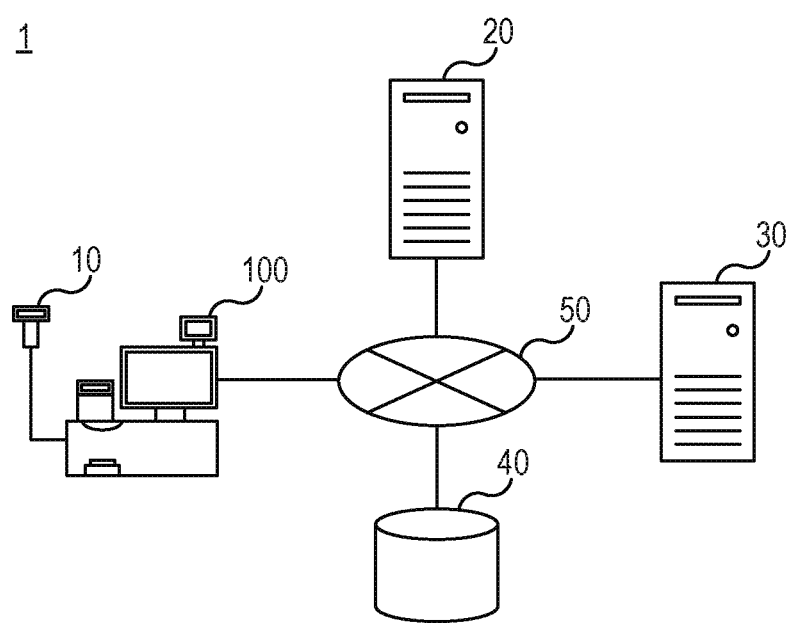
FIG. 1 is a schematic diagram of a POS system according to a first example embodiment.

While example embodiments of the present invention will be described below with reference to the drawings, the present invention is not limited to these example embodiments. Note that, in the drawings described below, components having the same function are labeled with the same reference, and the repeated description thereof may be omitted.

First Example Embodiment

FIG. 1 is a schematic diagram of a POS system 1 according to the present example embodiment. The POS system 1 includes a POS terminal 100 (sales of point information management terminal), a POS server 20, a Price Look Up (PLU) server 30, and a sales information storage device 40 that stores sales information. The POS terminal 100, the POS server 20, the PLU server 30, and the sales information storage device 40 are connected by at least one of wired connection and wireless connection via any network 50 such as a local area network, the Internet, or the like. The POS system 1 may include a device such as another server, another terminal, or the like. Further, at least some of the POS terminal 100, the POS server 20, the PLU server 30, and the sales information storage device 40 may be configured as a single device.

The POS server 20 is a server that manages the POS terminal 100 or collects sales information. The PLU server 30 is a server that pre-stores item information indicating an item name, a price, or the like associated with an identifier of an item, acquires item information in response to an inquiry from the POS terminal 100, and transmits the item information to the POS terminal 100. A content and a storage form of item information are arbitrarily determined. The POS server 20 and the PLU server 30 are connected to the network 50 through wired communication or wireless communication and formed of a single computer or a cloud that is a collection of computer resources, respectively.

The sales information storage device 40 stores sales information (also referred to as journal data) indicating sales of an item paid at the POS terminal 100. A content and a storage form of sales information are arbitrarily determined. The sales information storage device 40 is connected to the network 50 through wired communication or wireless communication and formed of a single storage device or a combination of a plurality of storage devices. Further, the sales information storage device 40 may be built in the POS terminal 100, the POS server 20, or the PLU server 30.

The POS terminal 100 is a code reading device that is connected to a code scanner 10 and reads a code of a barcode (one-dimensional code), a two-dimensional code, or the like attached to an item by using the code scanner 10. Furthermore, the POS terminal 100 acquires an identifier of an item from the read code, acquires item information from the PLU server 30 based on the identifier, and registers the acquired item information as a payment subject. At this time, as described later, the POS terminal 100 determines whether or not to make a discount by changing the color (wavelength) of an irradiation light from the code scanner 10 and reading a code and reflects the determined discount to item information. The POS terminal 100 then accepts a payment from a customer by using the acquired item information, generates sales information from the item information on which a payment is made, and stores the generated sales information in the sales information storage device 40.

Figure 2:
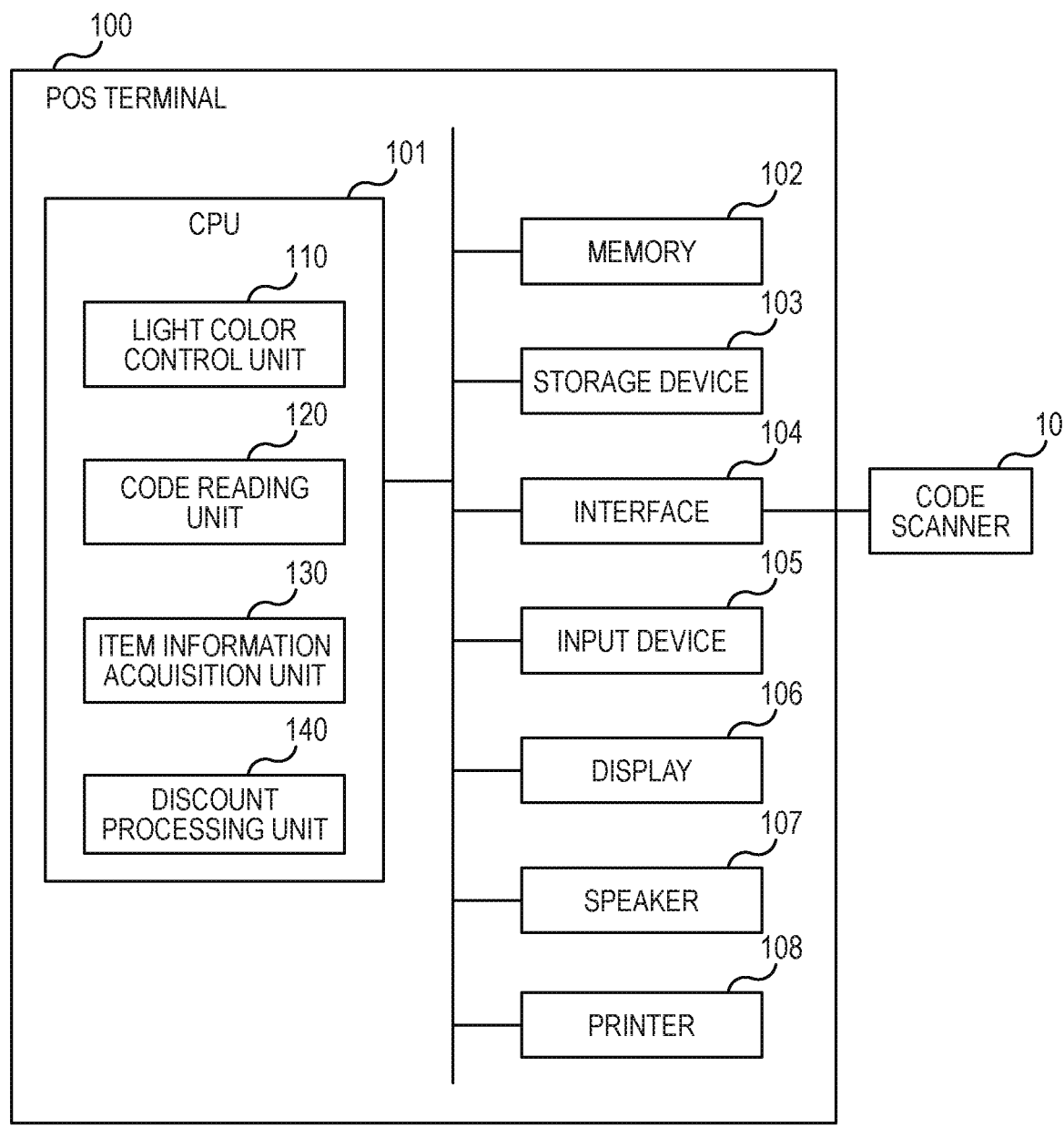
FIG. 2 is a schematic configuration diagram of a POS terminal according to the first example embodiment.

FIG. 2 is a schematic configuration diagram of the POS terminal 100 according to the present example embodiment. The POS terminal 100 has a central processing unit (CPU) 101, a memory 102, a storage device 103, and an interface 104. Furthermore, the POS terminal 100 has an input device 105, a display 106, a speaker 107, and a printer 108. The POS terminal 100 is not limited to the configuration illustrated in FIG. 2 but may further have other components. The POS terminal 100 may be formed of one or a plurality of devices or may be formed integrally with another device. Further, the POS terminal 100 may be connected to a separate device, and at least a part of the process performed by the POS terminal 100 in the present example embodiment may be performed by the separate device.

The interface 104 is a communication unit that transmits and receives data and is configured to be able to perform at least one communication scheme of wired communication and wireless communication. The interface 104 includes a processor, an electric circuit, an antenna, a connection terminal, or the like required for the communication scheme. The interface 104 performs communication by using such communication scheme in accordance with a signal from the CPU 101.

The storage device 103 stores a program executed by the POS terminal 100, data of a process result obtained by the program, or the like. The storage device 103 includes a read only memory (ROM) dedicated to reading, a hard disk drive or a flash memory that is readable and writable, or the like. Further, the storage device 103 may include a computer readable portable storage medium such as a CD-ROM. The memory 102 includes a random access memory (RAM) or the like that temporarily stores data being processed by the CPU 101 or data read from the storage device 103.

The CPU 101 is a processor that temporarily stores temporary data used for processing in the memory 102, reads a program stored in the storage device 103, and executes various processing operations such as calculation, control, determination, or the like on the temporary data in accordance with the program. Further, the CPU 101 stores data of a process result in the storage device 103 and also transmits data of the process result externally via the interface 104.

The input device 105 includes a keyboard or the like that accepts entry mainly from a shop assistant and transmits input contents to the CPU 101 as a signal. A touchscreen in which the input device 105 and the display 106 are integrated may be used.

The display 106 is a display device that displays information to a shop assistant or a customer. Any display device such as a cathode ray tube (CRT) display, a liquid crystal display, or the like may be used as the display 106. The display 106 displays predetermined information such as an item name, a price, or the like in accordance with a signal from the CPU 101. The displays 106 may be provided on the shop assistant side and a customer side, respectively, and in such a case, different information may be displayed on each of the displays 106.

The speaker 107 is a voice output device that outputs voice in accordance with a signal from the CPU 101. The printer 108 is a printer device that prints a receipt, a cash receipt, a voucher ticket, or the like in accordance with a signal from the CPU 101. Any printer device such as a thermal printer, an ink jet printer, a laser printer, or the like may be used as the printer 108.

The interface 104 is connected to the network 50 and connected to the code scanner 10 in the present example embodiment. As the code scanner 10, any of a handy type code scanner 10 illustrated in FIG. 3 and a stationary type code scanner 10 illustrated in FIG. 4 may be used.

Figure 3:
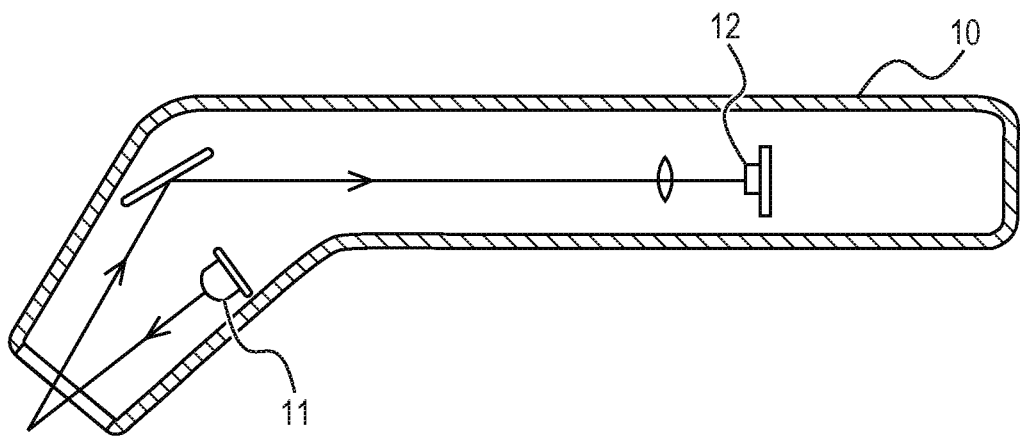
FIG. 3 is a sectional view of a handy type code scanner according to the first example embodiment.

FIG. 3 is a sectional view of the handy type code scanner 10. The handy type code scanner 10 has a light emitting element 11 and a light receiving element 12 used for scanning a code attached to an item. FIG. 3 schematically illustrates a light path from the light emitting element 11 to the light receiving element 12 by arrows. A light from the light emitting element 11 is emitted to an item via a window provided in a part of the code scanner 10. Furthermore, a mirror that further reflects and guides a reflected light from an item to the light receiving element 12 and a lens that captures a reflected light from the item on the light receiving element 12 are provided inside the code scanner 10.

The light emitting element 11 corresponds to light emitting elements that generate at least lights of the three primary colors of a red light, a green light, and a blue light and, generation of lights of respective colors can be controlled independently. The light emitting element 11 is provided to a position from which a code attached on an item can be irradiated with a light. The color of a light corresponds to the wavelength of the light, and the wavelength region of each color conforms to a known definition. As the light emitting element 11, any light emitting element that can generate a light of a predetermined wavelength, such as a light emitting diode (LED), a laser diode (LD), or the like, can be used. The light emitting element 11 generates a light at a predetermined color (wavelength) and a timing in accordance with a control signal from the CPU 101 of the POS terminal 100 and irradiates a code attached to an item with the generated light.

In response to receiving a reflected light generated by a light from the light emitting element 11 being reflected by a code attached to an item, the light receiving element 12 converts the reflected light into a signal. The light receiving element 12 then transmits a signal indicating a reflected light from a code attached to an item to the CPU 101 of the POS terminal 100. As the light receiving element 12, any light receiving element may be used that can convert a light into an electrical signal, such as a Charge Coupled Device (CCD) sensor, a Complementary Metal Oxide Semiconductor (CMOS) sensor, or the like.

Figure 4:
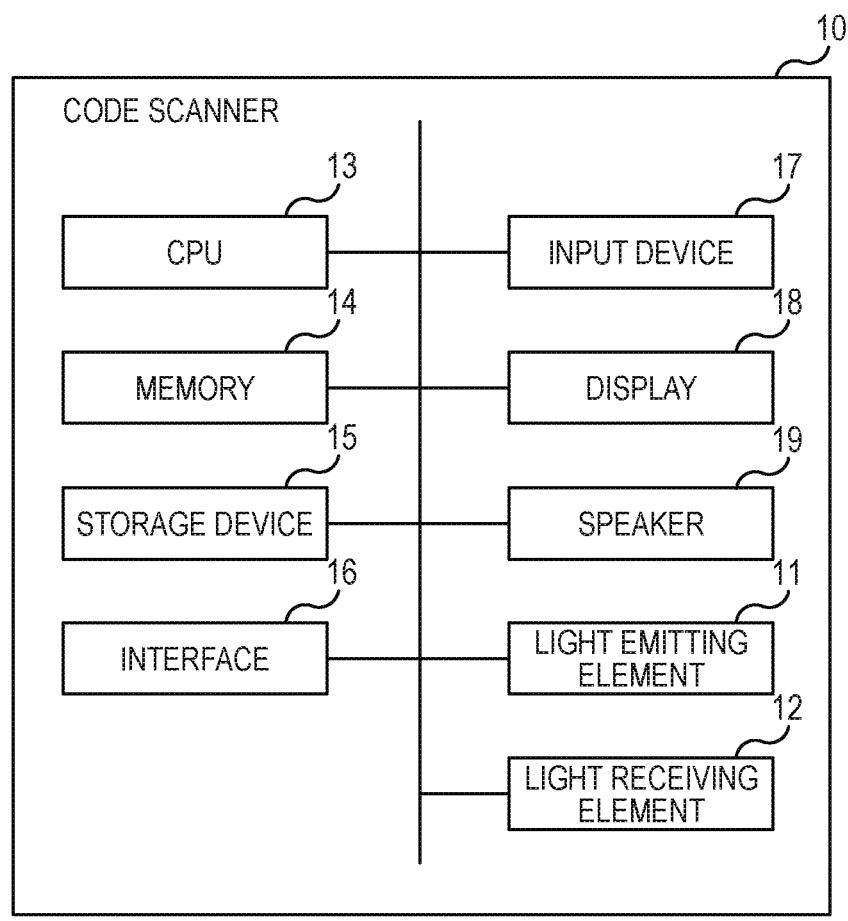
FIG. 4 is a schematic configuration diagram of a stationary type code scanner according to the first example embodiment.

FIG. 4 is a schematic configuration diagram of the stationary type code scanner 10. The stationary type code scanner 10 has a CPU 13, a memory 14, a storage device 15, an interface 16, an input device 17, a display 18, and a speaker 19 in addition to the light emitting element 11 and the light receiving element 12. The features of the CPU 13, the memory 14, the storage device 15, the interface 16, the input device 17, the display 18, and the speaker 19 are the same as those of the CPU 101, the memory 102, the storage device 103, the interface 104, the input device 105, the display 106, and the speaker 107 of the POS terminal 100.

The stationary type code scanner 10 has the CPU 13 and thus operates alone without subjected to control from the POS terminal 100. The stationary type code scanner 10 scans a code attached to an item by using the light emitting element 11 and the light receiving element 12 in the same manner as the handy type code scanner 10 illustrated in FIG. 3.

The POS terminal 100 according to the present example embodiment functions as a code reading device. In more detail, the CPU 101 of the POS terminal 100 functions as a light color control unit 110, a code reading unit 120, an item information acquisition unit 130, and a discount processing unit 140 described later by executing a program stored in the storage device 103.

Figure 5:
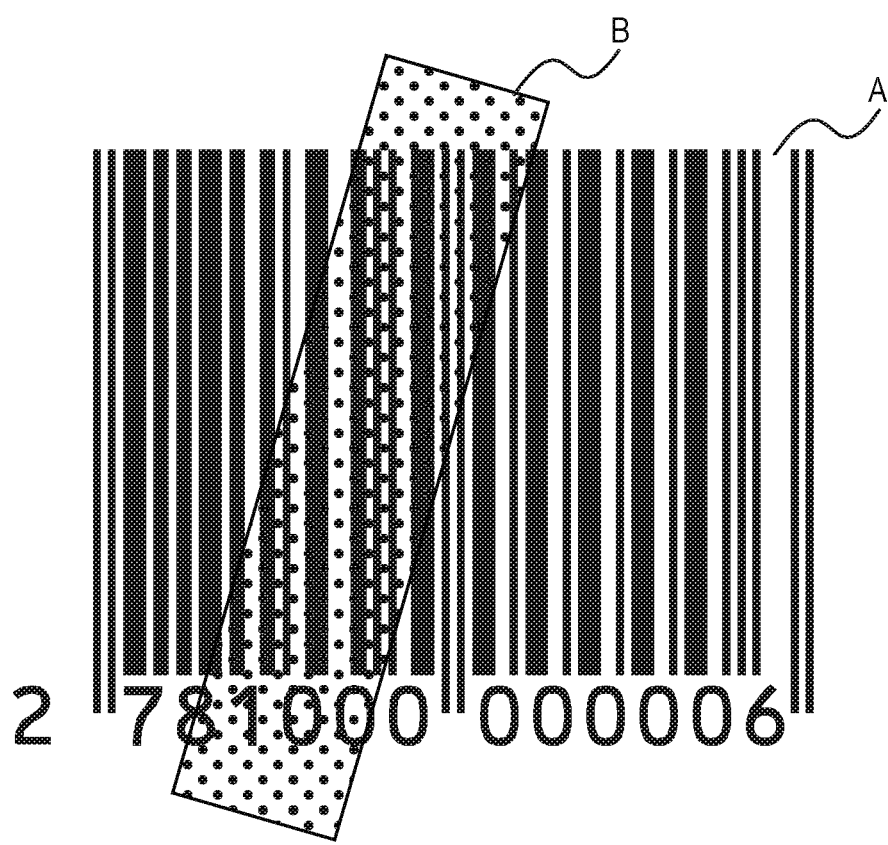
FIG. 5 is a front view of an exemplary code used in the first example embodiment.

In the following, a code reading method using the code reading device (the POS terminal 100) according to the present example embodiment will be described by using FIG. 5 to FIG. 9. FIG. 5 is a front view of an exemplary code A used in the present example embodiment. In the present example embodiment, a barcode (one-dimensional code) representing a Japan Article Number (JAN) code is used as the code A. The JAN code is a 13-digit or 8-digit number and used as an identifier of an item. A barcode represents information with bold lines, thin lines, bold spaces, and thin spaces being aligned with a predetermined rule. While lines are black and spaces are white in a barcode in the present example embodiment, any combination of other colors that are distinguishable by the code scanner 10 may be used. As the code A, any code that encodes information by a printed symbol, such as other one-dimensional codes, two-dimensional codes, or the like, may be used.

The POS terminal 100 acquires a JAN code as an identifier of an item by causing the code scanner 10 to read the code A and decoding the code A with a predetermined rule. The JAN code indicated by the code A is expressed by numbers near the code A. When the code scanner 10 is unable to read a barcode, a shop assistant may reference the numbers and input the JAN code from the input device 105.

A discount line B of a predetermined color is drawn on the code A of an item which is a discount subject. In the present example embodiment, the color of the discount line B is blue-green that is the complementary color of red. In FIG. 5, the region of the predetermined color (blue-green) is represented by a number of dots. The discount line B is drawn on the code A attached to an item which is a discount subject. At this time, the discount line B is drawn such that the code A cannot be recognized when the region of the discount line B is recognized as black (that is, when filled). In other words, the discount line B is drawn so as to cover a portion of the code A corresponding to at least one of the numbers (13 digits or 8 digits) represented by the code A. When a part of the code A is missed in such a way, an error occurs in decoding the code A, and thus no information of the code A can be read.

When a discount of an item is made for a reason such as best-before date (expiration date) being coming soon, a shop assistant draws the discount line B by using a pen, a stamp, or the like on the code A that has already been attached to the item. When the POS terminal 100 reads the code A, the item of the code A on which the discount line B of a predetermined color is drawn is discounted in a predetermined way by a discount process described later.

Figure 6:
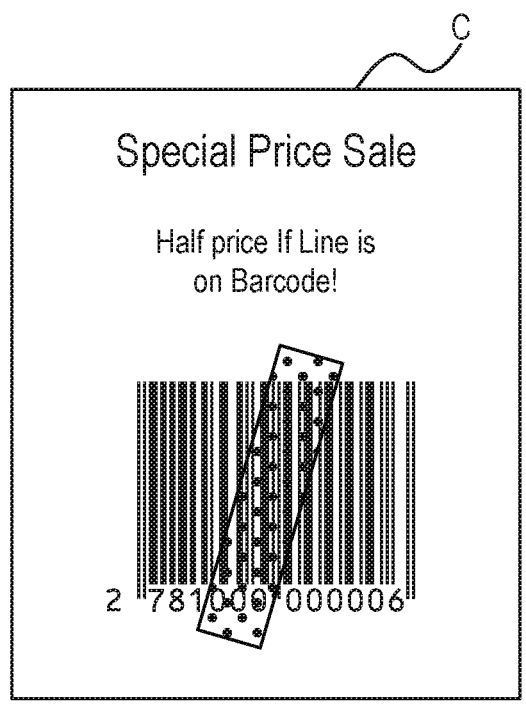
FIG. 6 is a diagram illustrating a notice indicating a discount rate or a discount price of an item.

To inform a customer of a discount rate or a discount price indicated by the discount line B, it is desirable to provide inside the shop a notice C indicating the discount rate or the discount price of the item on which the discount line B is drawn as illustrated in FIG. 6. Alternatively, a shop assistant may hand over the item on which the discount line B is drawn after orally conveying the discount rate or the discount price to a customer.

Figure 7:
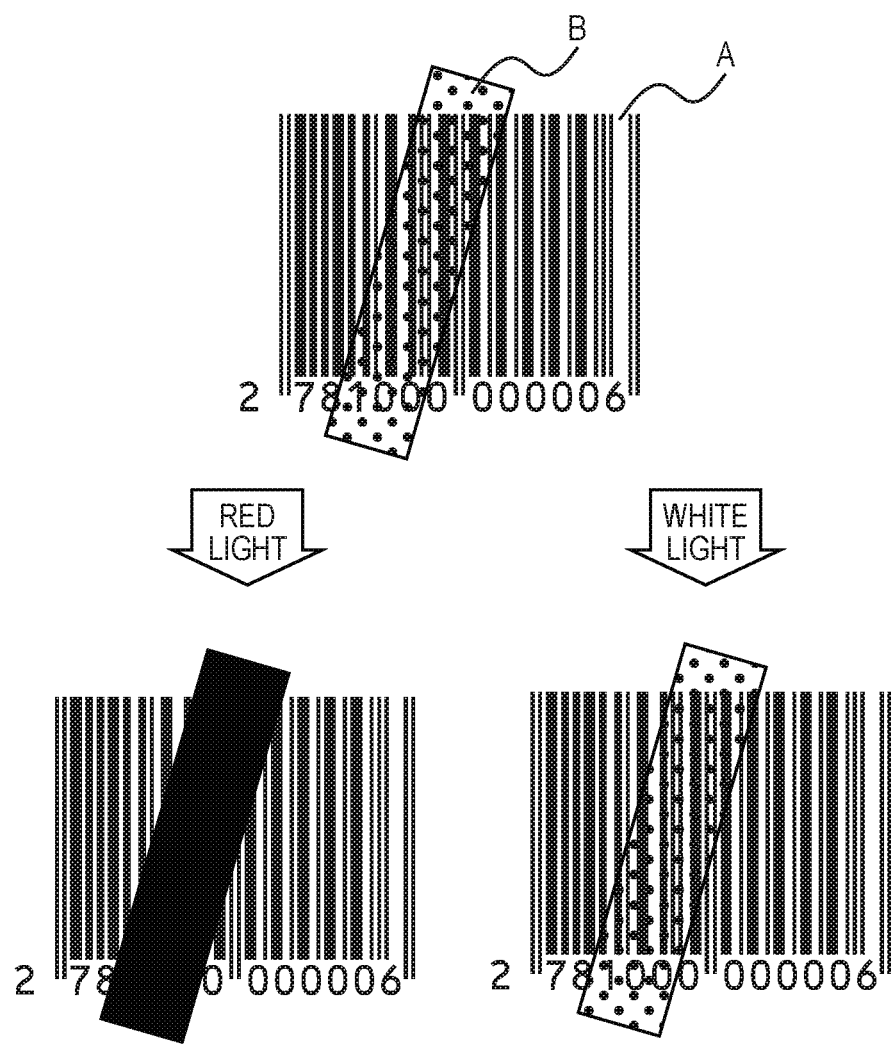
FIG. 7 is a schematic diagram of a code reading method according to the first example embodiment.

FIG. 7 is a schematic diagram of a code reading method according to the present example embodiment. FIG. 7 schematically illustrates a result of reading when the code A on which a blue-green discount line B is drawn is irradiated with a red light and irradiated with a white light from the code scanner 10. Since blue-green is the complementary color of red, the blue-green discount line B does not reflect a red light. Thus, when the code A is irradiated with a red light, since the region of the discount line B is recognized in the same way as the case of black, the POS terminal 100 is no longer able to distinguish a part of lines and spaces included in the code A and is unable to read the information represented by the code A. On the other hand, when the code A is irradiated with a white light, since the region of the discount line B is recognized in the same manner as the case of being watched by human eyes, the POS terminal 100 is able to distinguish lines and spaces included in the code A and is able to read the information represented by the code A.

FIG. 8 is a diagram illustrating a graph of the light reception intensity resulted by the code reading method according to the present example embodiment. The light reception intensity is measured by the light receiving element 12 of the code scanner 10. The upper stage of FIG. 8 illustrates the exemplary code A and discount line B. The middle stage and the lower stage of FIG. 8 illustrate graphs of the light reception intensities (voltages) when the code A and the discount line B in the upper stage are irradiated with a red light or a white light, respectively. The left and right positions in the graphs on the middle stage and the lower stage of FIG. 8 correspond to the left and right positions in the code A and the discount line B on the upper stage. In each graph, a range B1 corresponding to the position of the discount line B is illustrated.

In the graph of FIG. 8, a light is less reflected in a region of a line in the code A resulting in a low voltage, and a light is much reflected in a region of a space in the code A resulting in a high voltage. The POS terminal 100 determines a region in which the voltage is greater than or equal to a predetermined threshold D as a region of a space and determines a region in which the voltage is less than the predetermined threshold D as a region of a line. As the predetermined threshold D, a predetermined ratio (for example, 50%) of the maximum voltage difference obtained by subtracting the minimum value from the maximum value of the voltage of a range corresponding to the code A in the graph is used, for example.

As illustrated in FIG. 7, since the blue-green discount line B does not reflect a red light, in the graph in the middle stage of FIG. 8 when a red light is emitted, the voltage does not rise in the region of the space included in the range B1 of the discount line B and is substantially the same voltage as regions of lines. Thus, the POS terminal 100 is unable to distinguish the region of the line from the region of the space of the code A included in the range B1 of the discount line B when a red light is emitted.

On the other hand, in the graph in the lower stage of FIG. 8 when a white light is emitted, the voltage is higher in the region of the space included in the range B1 of the discount line B than in the regions of lines and is above the predetermined threshold D. Thus, the POS terminal 100 is able to distinguish the region of the line from the region of the space of the code A included in the range B1 of the discount line B when a white light is emitted. Note that, since a part of a white light is absorbed by the blue-green discount line B, the voltage is lower in the region of the space included in the range B1 of the discount line B than in the regions of other spaces.

Figure 9A:
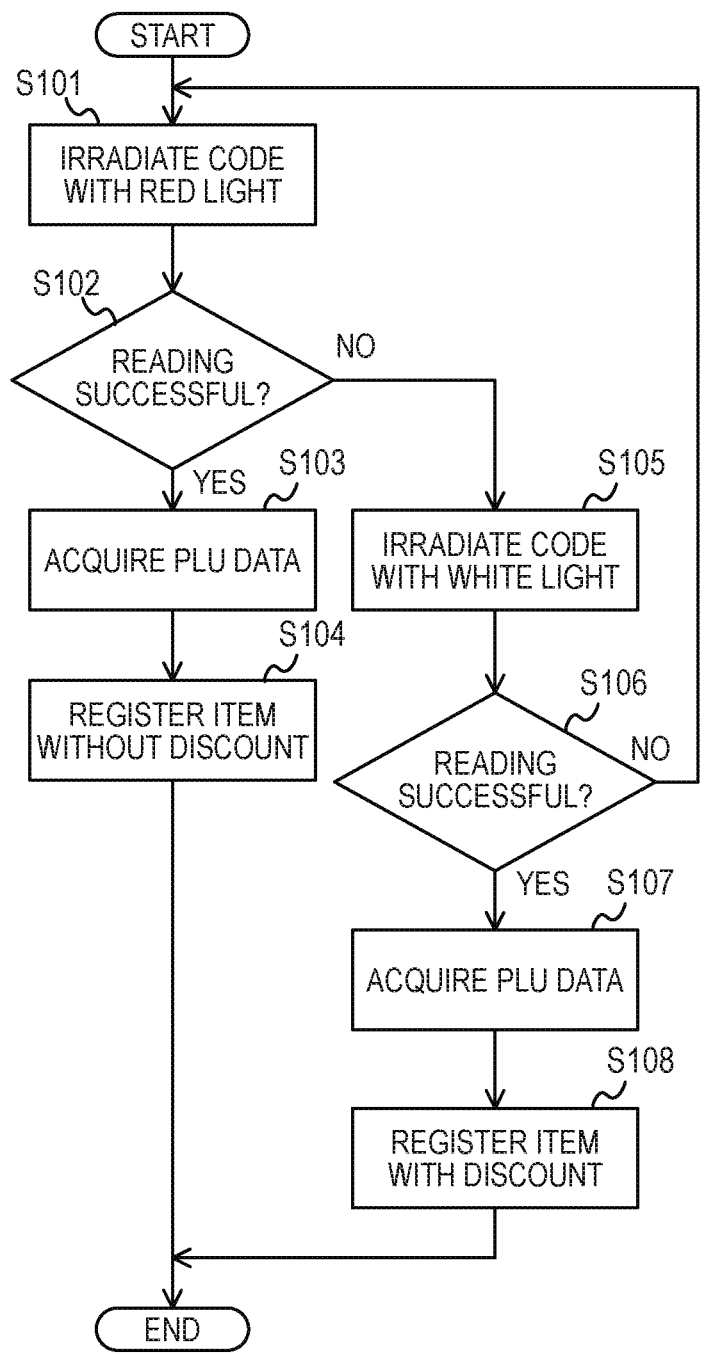
FIG. 9A is a diagram illustrating a flowchart of the code reading method according to the first example embodiment.
Figure 9B:
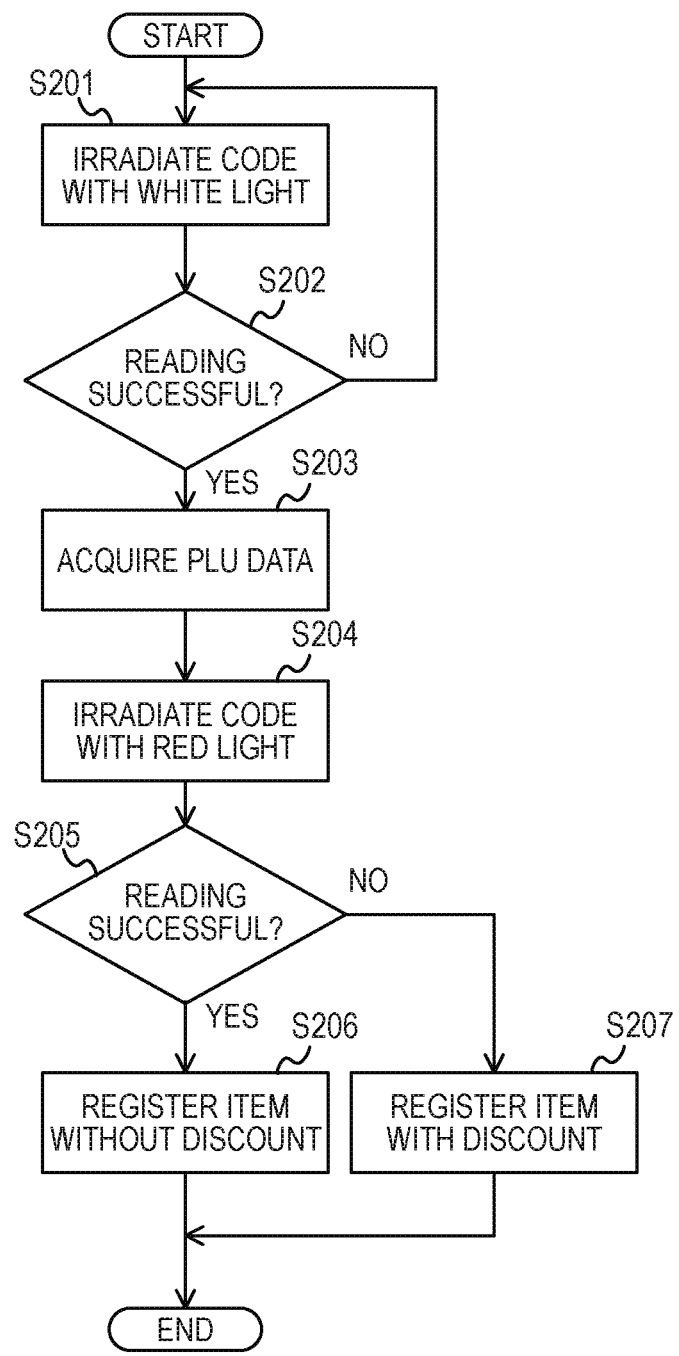
FIG. 9B is a diagram illustrating a flowchart of the code reading method according to the first example embodiment.

The POS terminal 100 (code reading device) according to the present example embodiment performs code reading by utilizing the phenomenon of FIG. 7 and FIG. 8. FIG. 9A and FIG. 9B are diagrams illustrating flowcharts of the code reading method according to the present example embodiment. The code reading method is started by the shop assistant performing an operation to start reading of a code attached to the item on the POS terminal 100, for example. FIG. 9A illustrates a form of performing reading by using a white light after performing reading by using a red light, FIG. 9B illustrates a form of performing reading by using a red light after performing reading by using a white light.

In the flowchart of FIG. 9A, first, the light color control unit 110 irradiates the code A with a red light by controlling the code scanner 10 (step S101). The code reading unit 120 then receives, from the code scanner 10, a signal indicating a light from the code A and decodes the light from the code A with a predetermined rule. As a result of decoding, if the information of the code A is read with the red light (step S102, YES), the discount processing unit 140 determines to make no discount. The item information acquisition unit 130 acquires item information (PLU data) from the PLU server 30 based on an identifier of an item read from the code A (step S103), and the discount processing unit 140 registers the item information as a payment subject without a discount (step S104).

As a result of decoding, if the information of the code A is not read with the red light (step S102, NO), the light color control unit 110 then controls the code scanner 10 to irradiate the code A with a white light (step S105). The code reading unit 120 receives, from the code scanner 10, a signal indicating a light from the code A and decodes the light from the code A with a predetermined rule. As a result of decoding, if the information of the code A is read with the white light (step S106, YES), the discount processing unit 140 determines to make a discount. The item information acquisition unit 130 acquires item information (PLU data) from the PLU server 30 based on the identifier of the item read from the code A (step S107), the discount processing unit 140 registers the item information as a payment subject after applying a predetermined discount thereto (for example, a 50% discount) (step S108). If the information of the code A is not read with the white light (step S106, NO), the process returns to step S101, and reading of the code A is repeated.

In the flowchart of FIG. 9B, first, the light color control unit 110 controls the code scanner 10 to irradiate the code A with a white light (step S201). The code reading unit 120 then receives, from the code scanner 10, a signal indicating a light from the code A and decodes the light from the code A with a predetermined rule. As a result of decoding, if the information of the code A is not read with the white light (step S202, NO), the process returns to step S201, and reading of the code A is repeated.

As a result of decoding, if the information of the code A is read with the white light (step S202, YES), the item information acquisition unit 130 acquires item information (PLU data) from the PLU server 30 based on an identifier of an item read from the code A (step S203). Next, the light color control unit 110 controls the code scanner 10 to irradiate the code A with a red light (step S204). The code reading unit 120 receives, from the code scanner 10, a signal indicating a light from the code A and decodes the light from the code A with a predetermined rule. As a result of decoding, if the information of the code A is read with the red light (step S205, YES), the discount processing unit 140 determines to make no discount and registers the item information acquired in step S203 as a payment subject without a discount (step S206).

As a result of decoding, if the information of the code A is not read with the red light (step S205, NO), the discount processing unit 140 determines to make a discount and registers the item information acquired in step S203 as a payment subject after applying a predetermined discount thereto (for example, a 50% discount) (step S207).

The flowcharts of FIG. 9A and FIG. 9B are examples, and the order or the content of the steps may be changed as appropriate unless the function of the present example embodiment is impaired.

The CPU 101 of the POS terminal 100 serves as a subject of each step (process) included in the code reading method illustrated in FIG. 9A and FIG. 9B. That is, the CPU 101 reads a code reading program used for performing the code reading method illustrated in FIG. 9A and FIG. 9B from the memory 102 or the storage device 103, executes the program to control each unit of the POS terminal 100, and thereby performs the code reading method illustrated in FIG. 9A and FIG. 9B.

In the present example embodiment, the POS terminal 100 is used as the code reading device. As another method, when the stationary type code scanner 10 of FIG. 4 is used, the stationary type code scanner 10 may be used as the code reading device. In such a case, the CPU 13 of the code scanner 10 executes the program stored in the storage device 15, thereby functions as the light color control unit 110, the code reading unit 120, the item information acquisition unit 130, and the discount processing unit 140, and serves as a subject of each step (process) included in the code reading method illustrated in FIG. 9A and FIG. 9B.

According to the present example embodiment, the POS terminal 100 can easily recognize that the discount line B is drawn on the code A and acquire information represented by the code A. The POS terminal 100 then can determine that the item is a discount subject in accordance with the presence or absence of the discount line B on the code A. Since it is not necessary for a shop assistant to attach a seal indicating a discount to an item for making a discount or print a label including the post-discount code A, it is possible to reduce workload in making a discount. Further, since a discount is automatically made by only causing the code scanner 10 to read the code A without requiring the shop assistant to perform a particular operation on the POS terminal 100, an oversight or an input error of a discount can be prevented.

Second Example Embodiment

While the code A is read by using a red light and a white light to the blue-green discount line B in the first example embodiment, the color of a discount line and the color of a light that are available in the present invention are not limited thereto. In the present example embodiment, the color of a discount line and the color of a light that are available in the present invention will be described. In the present example embodiment, the POS terminal 100 having the same configuration as that of the first example embodiment is used.

FIG. 10 is a diagram illustrating a table as to whether or not reading is successful for each combination of colors of a discount line B drawn on the code A and colors of a light used in reading. The color of a light corresponds to a wavelength of the light, and the wavelength region of each color conforms to a known definition. Further, the color of the discount line B corresponds to a wavelength of the light reflected by the discount line B, and the wavelength region of each color conforms to a known definition.

FIG. 10 illustrates an expected result of reading when one draws the discount lines B on the code A by pens of red, green, and blue that are the three primary colors of light and tries to read the code A by using a red light, a green light, a blue light, and a white light. In the table of FIG. 10, a mark "circle" is placed when the information of the code A is read, and a mark "cross" is placed when the information is not read.

In the first example embodiment, the code A is irradiated with lights of two different colors, and the presence of the discount line B is detected to make a discount when the information of the code A is not read with a light of one of the colors (first light) but is read with a light of the other color (second light). That is, the first example embodiment is realized by using a light of a color which enables reading and a light of a color which disables reading on a particular color of line in FIG. 10. For example, in the case of the red discount line B, a combination of a red light and a blue light, a combination of a red light and a green light, a combination of a white light and a blue light, and a combination of a white light and a green light can be used from FIG. 10. For the green discount line B and the blue discount line B, a plurality of combinations of color lights can be used in a similar manner.

While red, green, blue, and white are used here as the colors of lights used for irradiating the code A, the color is not limited thereto. As colors of lights used for irradiating the code A, lights of any colors can be used which are distinguishable in accordance with the characteristics of the light receiving element 12 of the code scanner 10. Further, also for the color of the discount line B, lines of any colors can be used which are distinguishable in accordance with the characteristics of the light receiving element 12 of the code scanner 10 without being limited to red, green, and blue.

Third Example Embodiment

While the discount line B corresponding to the three primary colors of light is used in the first and second example embodiments, the discount line B of an intermediate color generated by mixing the three primary colors of light at a predetermined ratio can also be utilized in the present invention. In the present example embodiment, a process performed when the discount line B of an intermediate color is used will be described. In the present example embodiment, the POS terminal 100 having the same configuration as that of the first and second example embodiments is used.

As an example here, the discount line B of an intermediate color generated at a ratio of red 50%, green 50%, and blue 100% is used. The ratio of each color corresponds to a reflection rate of a light of the color of interest, a white light is obtained when each of all the colors is at 100%. The ratio of each color included in an intermediate color is not limited to the above, any ratio may be set. A method of detecting the discount line B of an intermediate color by using the light emitting element 11 having no dimming function of emitting a red light, a green light, and a blue light will be described below.

Figure 11:
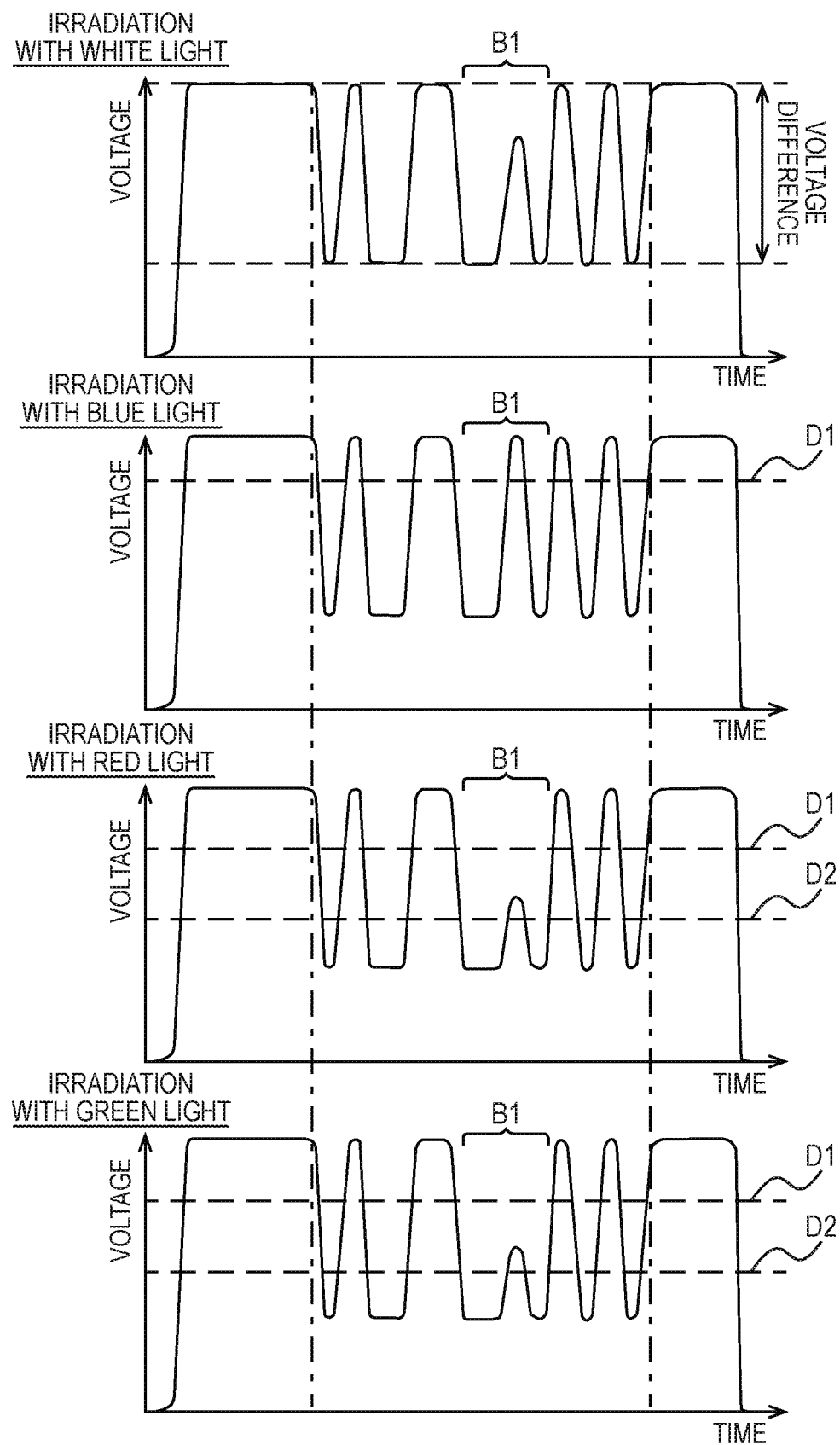
FIG. 11 is a diagram illustrating a graph of the light reception intensity resulted by a code reading method according to a third example embodiment.

FIG. 11 is a diagram illustrating a graph of the light reception intensity by the code reading method according to the present example embodiment. The light reception intensity is measured by the light receiving element 12 of the code scanner 10. FIG. 11 illustrates graphs of the light reception intensities (voltages) when the discount line B of an intermediate color is irradiated with a white light, a blue light, a red light, or a green light, respectively. The left and right positions in each graph of FIG. 11 correspond to the left and right positions in the code A and the discount line B on the upper stage of FIG. 8. In each graph of FIG. 11, a range B1 corresponding to the position of the discount line B is illustrated.

When a white light is emitted, the maximum voltage difference obtained by subtracting the minimum value from the maximum value of the voltage of a range corresponding to the code A in the graph is calculated. That is, this maximum voltage difference corresponds to a difference in the output voltage between a region of a space and a region of a line of the code A. The maximum voltage difference is used for setting a threshold used for distinguishing a region of a space and a region of a line of the code A. Here, a high threshold D1 (first threshold) that is 70% of the maximum voltage difference and a low threshold D2 (second threshold) that is 30% of the maximum voltage difference are set. The maximum voltage difference may be pre-recorded before the code reading method is performed or may be calculated every time the code reading method is performed.

When a blue light is emitted, since the discount line B of the intermediate color reflects 100% of the blue light, the voltage in the region of the space included in the range B1 of the discount line B rises equally to regions of other spaces and is above the high threshold D1. That is, when irradiated with the blue light, the information of the code A can be read by using each of the high threshold D1 and the low threshold D2.

When a red light or a green light is emitted, since the discount line B of the intermediate color reflects the red light and the green light by 50%, the voltage rises to around 50% of the maximum voltage difference in the region of the space included in the region B1 of the discount line B and is below the high threshold D1 and above the low threshold D2. That is, when the red light or the green light is emitted, no information of the code A can be read when the high threshold D1 is used, but the information of the code A can be read when the low threshold D2 is used.

Figure 12:
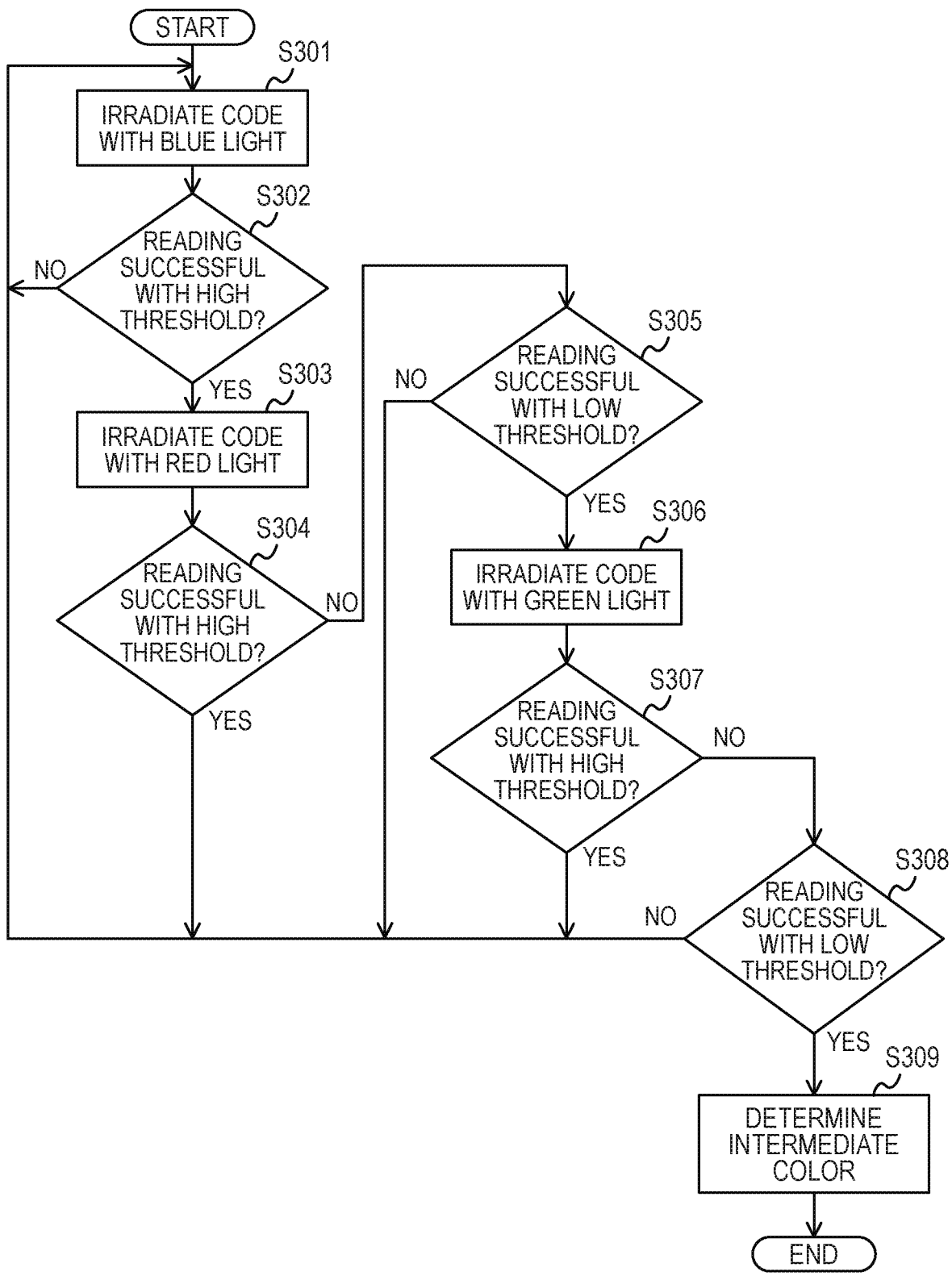
FIG. 12 is a diagram illustrating a flowchart of the code reading method according to the third example embodiment.

The POS terminal 100 (code reading device) according to the present example embodiment determines an intermediate color by utilizing the phenomenon of FIG. 11. FIG. 12 is a diagram illustrating a flowchart of the code reading method according to the present example embodiment. The code reading method is started by a shop assistant performing an operation to start reading of a code attached to the item on the POS terminal 100, for example.

First, the light color control unit 110 controls the code scanner 10 to irradiate the code A with a blue light (step S301). The code reading unit 120 receives, from the code scanner 10, a signal indicating a light from the code A, sets a threshold used for distinguishing a region of a space and a region of a line of the code A to the high threshold D1 (here, 70% of the maximum voltage difference), and then decodes the light from the code A in accordance with a predetermined rule. As a result of decoding, if the information of the code A is not read with the high threshold D1 by using the blue light (step S302, NO), the process returns to step S301, and reading of the code A is repeated.

As a result of decoding, if the information of the code A is read with the high threshold D1 by using the blue light (step S302, YES), the light color control unit 110 then controls the code scanner 10 to irradiate the code A with a red light (step S303). The code reading unit 120 receives, from the code scanner 10, a signal indicating a light from the code A, sets thresholds used for distinguishing a region of a space and a region of a line of the code A to the high threshold D1 and the low threshold D2 (here, 30% of the maximum voltage difference), and then decodes the light from the code A in accordance with a predetermined rule, respectively. As a result of decoding, if the information of the code A is read with the high threshold D1 by using the red light (step S304, YES) or if the information of the code A is neither read with the high threshold D1 nor the low threshold D2 by using the red light (step S304, NO, step S305, NO), the process returns to step S301, and reading of the code A is repeated.

As a result of decoding, if the information of the code A is not read with the high threshold D1 by using the red light but the information of the code A is read with the low threshold D2 (step S304, NO, step S305, YES), the light color control unit 110 then controls the code scanner 10 to irradiate the code A with a green light (step S306). The code reading unit 120 receives, from the code scanner 10, a signal indicating a light from the code A, sets thresholds used for distinguishing a region of a space and a region of a line of the code A to the high threshold D1 and the low threshold D2, and then decodes the light from the code A in accordance with a predetermined rule, respectively. As a result of decoding, if the information of the code A is read with the high threshold D1 by using the green light (step S307, YES) or if the information of the code A is neither read with the high threshold D1 nor the low threshold D2 by using the green light (step S307, NO, step S308, NO), the process returns to step S301, and reading of the code A is repeated.

As a result of decoding, if the information of the code A is not read with the high threshold D1 by using the green light but the information of the code A is read with the low threshold D2 (step S307, NO, step S308, YES), the code reading unit 120 determines that the discount line B of the intermediate color is present (step S309).

While including only the determination for an intermediate color, the flowchart of FIG. 12 is used practically as a part of the code reading method such as FIG. 9A or FIG. 9B, and a predetermined discount is made when the presence of the discount line B of an intermediate color is determined, for example. The flowchart of FIG. 12 is an example, and the order or the content of the steps may be changed as appropriate unless the function of the present example embodiment is impaired.

In such a way, by determining whether or not reading is successful by using a plurality of thresholds when a red light, a blue light, and a green light are emitted, respectively, it is possible to detect the discount line B of an intermediate color obtained by mixing red, blue, and green even when the light emitting element 11 having no dimming function of emitting a red light, a blue light, and a green light is used.

When determination of an intermediate color is enabled as with the present example embodiment, the color of a pen or a stamp used for drawing the discount line B on the code A can be a special color that is not commercially available. With the use of the configuration that needs a pen or a stamp of a less available special color in such a way, it is possible to make it difficult for a malicious customer to draw the discount line B on the code A by itself and wrongly receive a discount.

The high threshold D1 and the low threshold D2 that is smaller than the high threshold D1 illustrated here are examples, it is possible to determine any intermediate color by changing the high threshold D1 and the low threshold D2 in accordance with an intermediate color to be determined. The high threshold D1 and the low threshold D2 for a red light, a green light, and a blue light may be the same or may be different from each other.

For example, in the first example embodiment, a combination of a light of an intermediate color and a light of a white color may be used to determine whether or not reading is successful. Alternatively, a combination of a light of a first intermediate color and a light of a second intermediate color that is different from the first intermediate color may be used to determine whether or not reading is successful.

While the configuration in which the light emitting element 11 of the code scanner 10 has no dimming function for each color has been described in the present example embodiment, it is possible to perform determination on an intermediate color even with a use of a configuration in which the light emitting element 11 has a dimming function for each color. In such a case, the light color control unit 110 controls the code scanner 10 to irradiate the code A with a light of the same color as an intermediate color (here, red 50%, green 50%, blue 100%) used for the discount line B and a light of a complementary color (red 50%, green 50%, blue 0%) of the intermediate color. At this time, while the information of the code A is read with the light of the same color as the intermediate color, the information of the code A is not read with the light of the complementary color of the intermediate color. Thereby, the discount line B of the intermediate color can be detected.

Fourth Example Embodiment

In the first to third example embodiments, since a discount is made unconditionally for an item on which the discount line B is drawn, a malicious customer may draw the discount line B on the code A by itself and wrongly receive a discount. To suppress this, it is determined whether or not to make a discount based on item information stored in the PLU server 30 in addition to the presence or absence of the discount line B in the present example embodiment. In the present example embodiment, the POS terminal 100 having the same configuration as that of the first to third example embodiments is used.

FIG. 13A is a schematic diagram of item information E stored in the PLU server 30 according to the present example embodiment. The item information E of FIG. 13A includes an item name and a price associated with an item code (JAN code) that is an identifier of an item. A discount field is further associated with each item, a mark "circle" is set in the discount field of an item which is a discount subject, and a mark "cross" is set in the discount field of an item which is not a discount subject. For example, while cucumbers are discount subjects, bell peppers are not discount subjects. As long as distinction as to whether or not it is a discount subject is possible, the discount field may be placed with other characters or numbers, may be a blank, or may be placed with a null value without being limited to the mark "circle" and the mark "cross".

FIG. 13B is a schematic diagram of item information E stored in the PLU server 30 according to the present example embodiment. The item information E of FIG. 13B is provided such that the discount field is divided on a time range basis in the item information E of FIG. 13A. For each item, a mark "circle" is set in the discount field of a time range which is a discount subject, and a mark "cross" is set in the discount field of a time range which is not a discount subject. For example, crab salad is a discount subject between 18:00 and 22:00. As long as distinction as to whether or not it is a discount subject is possible, the discount field of each time range may be placed with other characters or numbers, may be a blank, or may be placed with a null value without being limited to the mark "circle" and the mark "cross".

In the present example embodiment, both the item information E of FIG. 13A and FIG. 13B can be used. In the configuration using the item information E of FIG. 13A, the POS terminal 100 determines to make a discount when the discount line B is detected on the code A of an item and when it is indicated by the item information E of the item that the item is a discount subject (that is, a mark "circle" is placed in the discount field). Thus, even when the discount line B is drawn on the code A attached to an item, no discount is made when the item information E of the item has no setting of a discount item. At this time, to inform a customer that the item is not a discount subject, it is desirable to display that a discount is unavailable on the display 106 of the POS terminal 100. In such a configuration, by a shop assistant setting availability of a discount in the item information E (PLU data) on an item basis in advance, it is possible to suppress a wrong discount.

In the configuration using the item information E of FIG. 13B, the POS terminal 100 determines to make a discount when the discount line B is detected on the code A of an item and when it is indicated by the item information E of the item at the current time (that is, the time when the code A is read) that the item is a discount subject (that is, a mark "circle" is placed in the discount field in the time range including the current time). Thus, even when the discount line B is drawn on the code A attached to an item, no discount is made when the item information E of the item has no setting of a discount subject at the current time. At this time, to inform a customer that the item is not a discount subject, it is desirable to display that a discount is unavailable on the display 106 of the POS terminal 100. In such a configuration, for example, at 18:00, a shop assistant draws the discount line B for fried oysters cooked in the morning and does not draw the discount line B for fried oysters cooked in the afternoon because no discount is needed. It is therefore possible to suppress a wrong discount and finely control availability of a discount on an item basis and on a time basis.

While the item information E is expressed by a table of character strings for better visibility in FIG. 13A and FIG. 13B, it may be expressed in any data format (file format), and binary data or text data may be used, for example. Further, the item information E may be stored in the PLU server 30 as a table of a database or may be stored in the PLU server 30 as a binary file or a text file.

Figure 14:
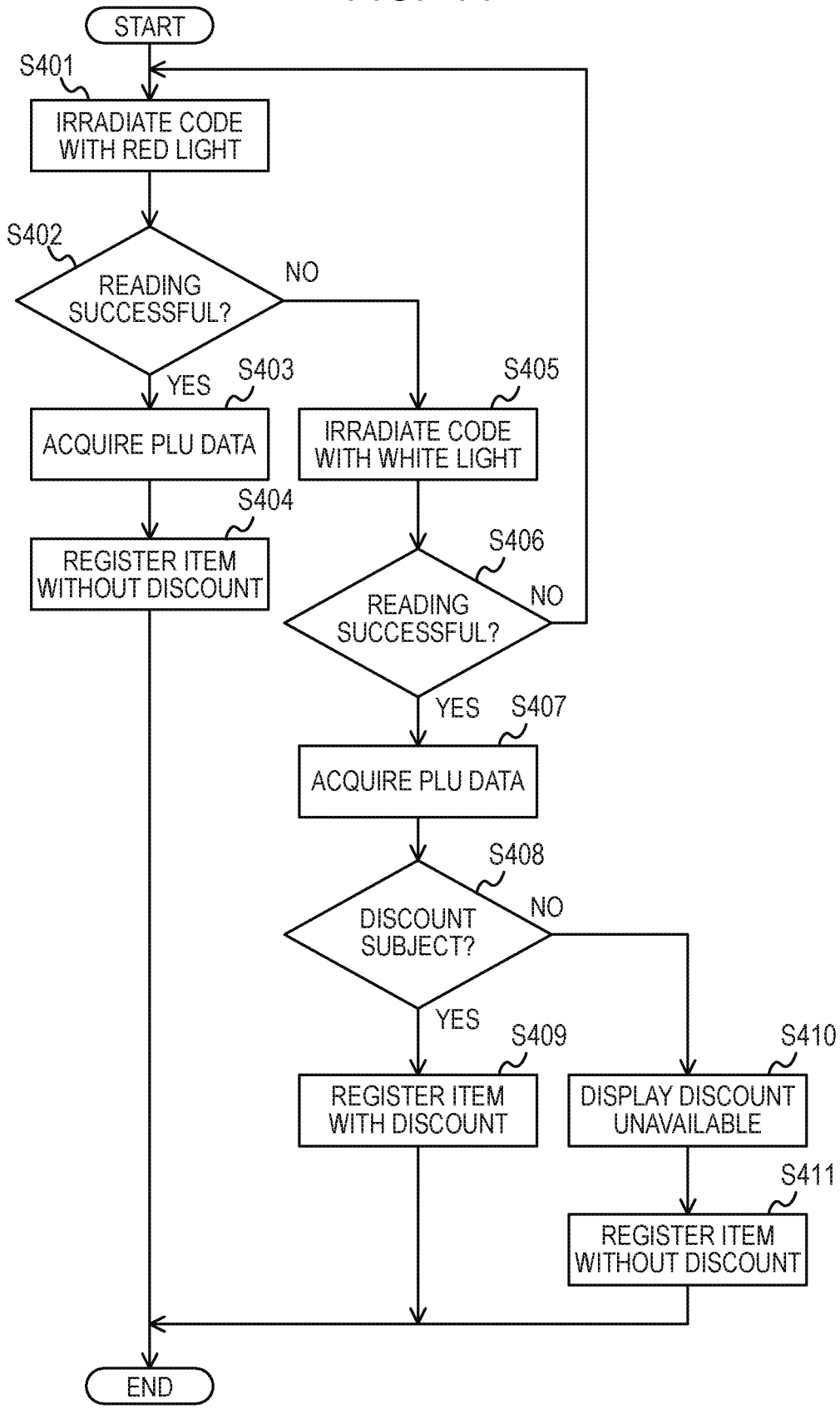
FIG. 14 is a diagram illustrating a flowchart of a code reading method according to the fourth example embodiment.
Figure 15:
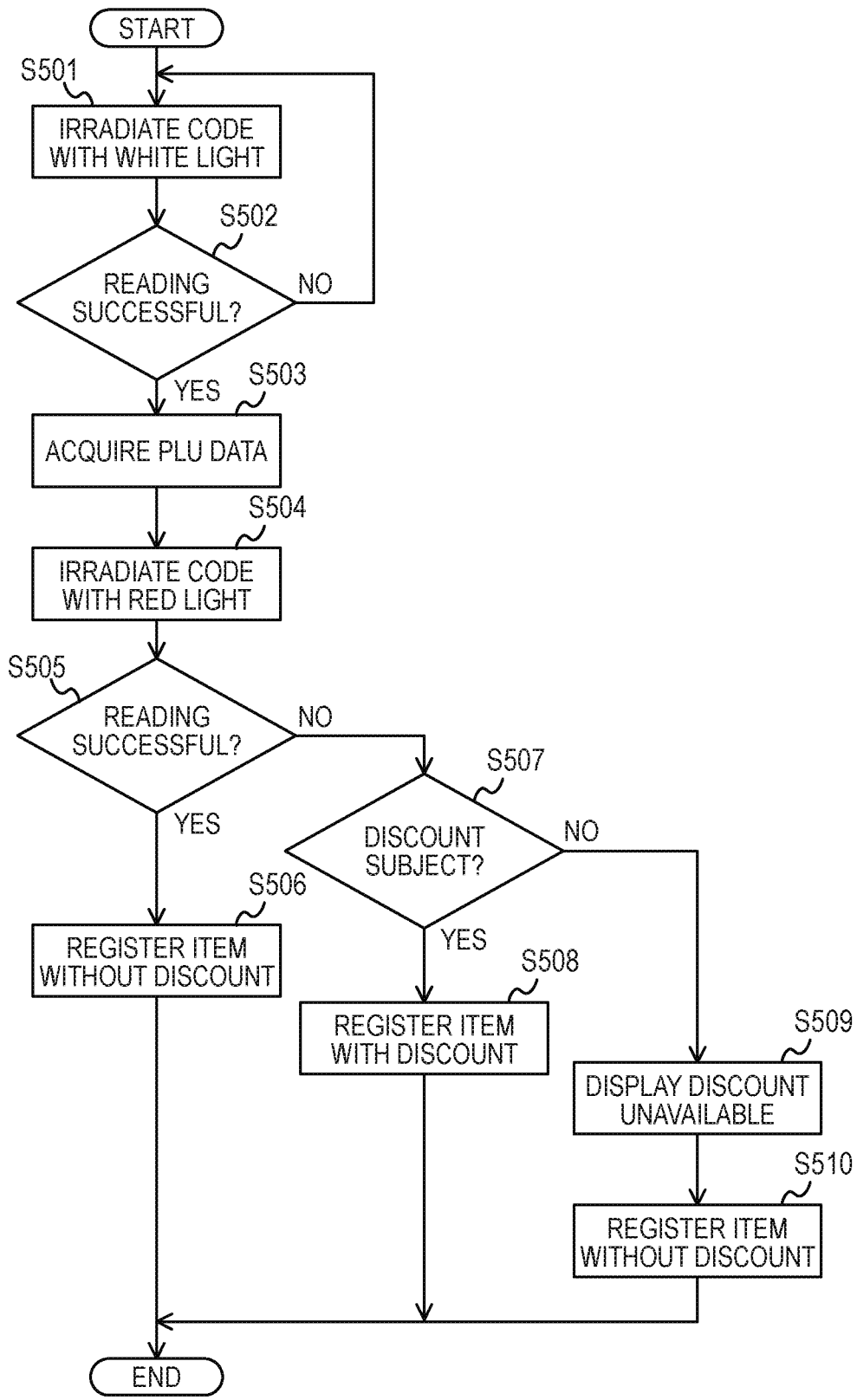
FIG. 15 is a diagram illustrating a flowchart of the code reading method according to the fourth example embodiment.

FIG. 14 and FIG. 15 are diagrams illustrating flowcharts of the code reading method according to the present example embodiment. The code reading method is started by a shop assistant performing an operation to start reading of a code attached to an item at the POS terminal 100, for example. FIG. 14 illustrates a form of performing reading by using a white light after performing reading by using a red light, and FIG. 15 illustrates a form of performing reading by using a red light after performing reading by using a white light. Further, when a combination of other colors is used as with the second example embodiment and when an intermediate color is used as with the third example embodiment, the flowchart is applicable with an appropriate change.

In the flowchart of FIG. 14, first, the light color control unit 110 controls the code scanner 10 to irradiate the code A with a red light (step S401). The code reading unit 120 then receives, from the code scanner 10, a signal indicating a light from the code A and decodes the light from the code A in accordance with a predetermined rule. As a result of decoding, if the information of the code A is read with the red light (step S402, YES), the discount processing unit 140 determines to make no discount. The item information acquisition unit 130 acquires item information (PLU data) from the PLU server 30 based on an identifier of an item read from the code A (step S403), and the discount processing unit 140 registers the item information as a payment subject without discount (step S404).

As a result of decoding, if the information of the code A is not read with the red light (step S402, NO), the light color control unit 110 then controls the code scanner 10 to irradiate the code A with a white light (step S405). The code reading unit 120 receives, from the code scanner 10, a signal indicating a light from the code A and decodes the light from the code A in accordance with a predetermined rule. As a result of decoding, if the information of the code A is not read with the white light (step S406, NO), the process returns to step S401, and reading of the code A is repeated.

As a result of decoding, if the information of the code A is read with the white light (step S406, YES), the item information acquisition unit 130 acquires item information (PLU data) from the PLU server 30 based on an identifier of an item read from the code A (step S407). The discount processing unit 140 then determines whether or not the item is a discount subject based on the item information. It is determined to be a discount subject when the read item is set as a discount subject in the configuration using the item information of FIG. 13A described above or when the read item is set as a discount subject in a time range including the current time in the configuration using the item information of FIG. 13B described above.

If it is determined to be a discount subject based on the item information (step S408, YES), the discount processing unit 140 applies a predetermined discount (for example, a 50% discount) and then registers the item information as a payment subject (step S409).

If it is not determined to be a discount subject based on the item information (step S408, NO), the discount processing unit 140 displays on the display 106 that a discount is unavailable (step S410) and registers the item information as a payment subject without discount (step S411).

In the flowchart of FIG. 15, first, the light color control unit 110 controls the code scanner 10 to irradiate the code A with a white light (step S501). The code reading unit 120 then receives, from the code scanner 10, a signal indicating a light from the code A and decodes the light from the code A in accordance with a predetermined rule. As a result of decoding, if the information of the code A is not read with the white light (step S502, NO), the process returns to step S501, and reading of the code A is repeated.

As a result of decoding, if the information of the code A is read with the white light (step S502, YES), the item information acquisition unit 130 acquires item information (PLU data) from the PLU server 30 based on an identifier of an item read from the code A (step S503). Next, the light color control unit 110 controls the code scanner 10 to irradiate the code A with a red light (step S504). The code reading unit 120 receives, from the code scanner 10, a signal indicating a light from the code A and decodes the light from the code A in accordance with a predetermined rule. As a result of decoding, if the information of the code A is read with the red light (step S505, YES), the discount processing unit 140 determines to make no discount and registers the item information acquired in step S503 as a payment subject without discount (step S506).

As a result of decoding, if the information of the code A is not read with the red light (step S505, NO), the discount processing unit 140 determines whether or not the item is a discount subject based on the item information acquired in step S503. It is determined to be a discount subject when the read item is set as a discount subject in the configuration using the item information of FIG. 13A described above or when the read item is set as a discount subject in a time range including the current time in the configuration using the item information of FIG. 13B described above.

If it is determined to be a discount subject based on the item information (step S507, YES), the discount processing unit 140 applies a predetermined discount (for example, a 50% discount) and then registers the item information as a payment subject (step S508).

If it is not determined to be a discount subject based on the item information (step S507, NO), the discount processing unit 140 displays on the display 106 that a discount is unavailable (step S509) and registers the item information as a payment subject without discount (step S510).

The flowcharts of FIG. 14 and FIG. 15 are examples, and the order or the content of the steps may be changed as appropriate unless the function of the present example embodiment is impaired.

The CPU 101 of the POS terminal 100 serves as a subject of each step (process) included in the code reading method illustrated in FIG. 14 and FIG. 15. That is, the CPU 101 reads a code reading program used for performing the code reading method illustrated in FIG. 14 and FIG. 15 from the memory 102 or the storage device 103, executes the program to control each unit of the POS terminal 100, and thereby performs the code reading method illustrated in FIG. 14 and FIG. 15.

As described above, since availability of a discount is registered in advance on an item basis in the present example embodiment, it is possible to suppress a customer from drawing a discount line by itself to receive a wrong discount. Furthermore, by registering availability of a discount in advance on a time range basis, it is possible to control availability of a discount more finely.

Fifth Example Embodiment

While availability of a discount is registered in item information (PLU data) in the fourth example embodiment, a discount rate or a discount price is registered in item information in addition to availability of a discount in the present example embodiment. Thereby, a wrong discount can be suppressed, and different discount rates or discount prices can be applied on an item basis. The configuration other than the above is the same as that of the fourth example embodiment.

FIG. 16A is a schematic diagram of the item information E stored in the PLU server 30 according to the present example embodiment. The item information E of FIG. 16A includes an item name and a price associated with an item code (JAN code) that is an identifier of an item. A discount field is further associated with each item, a discount rate is set in the discount field of an item which is a discount subject, and zero is set in the discount field of an item which is not a discount subject. For example, while cucumbers are discount subjects for a 50% discount, bell peppers are not discount subjects. Without limited to a discount rate, information indicating a discount from a normal sales price, such as a discount price, a price after a discount, or the like, is placed in the discount field. The discount field may indicate an item which is not a discount subject by placing a blank or placing a null value without limited to placing zero.

FIG. 16B is a schematic diagram of the item information E stored in the PLU server 30 according to the present example embodiment. The item information E of FIG. 16B is provided such that the discount field is divided on a time range basis in the item information E of FIG. 16A. For each item, a discount rate is set in the discount field of a time range which is a discount subject, and zero is set in the discount field of a time range which is not a discount subject. For example, crab salad is a discount subject for a 20% discount between 18:00 and 20:00 and is a discount subject for a 30% discount between 20:00 and 21:00. Without limited to a discount rate, information indicating a discount from a normal sales price, such as a discount price, a price after a discount, or the like, is placed in the discount field of each time range. The discount field of each time range may indicate an item which is not a discount subject by placing a blank or placing a null value without limited to placing zero.

In the present example embodiment, both the item information E of FIG. 16A and FIG. 16B can be used. In the configuration using the item information E of FIG. 16A, the POS terminal 100 determines to make a discount when the discount line B is detected on the code A of an item and when it is indicated by the item information E that the item is a discount subject (that is, zero is not placed in the discount field) and makes a discount by using the discount information placed in the discount field. Thus, even when the discount line B is drawn on the code A attached to an item, no discount is made when the item information E of the item has no setting of a discount subject. At this time, to inform a customer that the item is not a discount subject, it is desirable to display that a discount is unavailable on the display 106 of the POS terminal 100. In such a configuration, by a shop assistant setting discount information to the item information E (PLU data) on an item basis in advance, it is possible to suppress a wrong discount and apply different discounts on an item basis.

In the configuration using the item information E of FIG. 16B, the POS terminal 100 determines to make a discount when the discount line B is detected on the code A of an item and when it is indicated by the item information E of the item at the current time (that is, the time when the code A is read) that the item is a discount subject (that is, zero is not placed in the discount field in the time range including the current time) and makes a discount by using the discount information placed in the discount field of the time range including the current time. Thus, even when the discount line B is drawn on the code A attached to an item, no discount is made when the item information E of the item has no setting of a discount subject at the current time. At this time, to inform a customer that the item is not a discount subject, it is desirable to display that a discount is unavailable on the display 106 of the POS terminal 100. In such a configuration, for example, at 18:00, a shop assistant draws the discount line B for fried oysters cooked in the morning and does not draw the discount line B for fried oysters cooked in the afternoon because no discount is needed. It is therefore possible to suppress a wrong discount and apply different discounts on an item basis and on a time basis.

While the item information E is expressed by a table of character strings for better visibility in FIG. 16A and FIG. 16B, it may be expressed in any data format (file format), and binary data or text data may be used, for example. Further, the item information E may be stored in the PLU server 30 as a table of a database or may be stored in the PLU server 30 as a binary file or a text file.

As described above, since discount information is registered in advance on an item basis in the present example embodiment, it is possible to suppress a customer from drawing a discount line by itself to receive a wrong discount and apply different discounts on an item basis. Furthermore, by registering availability of a discount in advance on a time range basis, it is possible to control a discount more finely.

Other Example Embodiments

Figure 17:
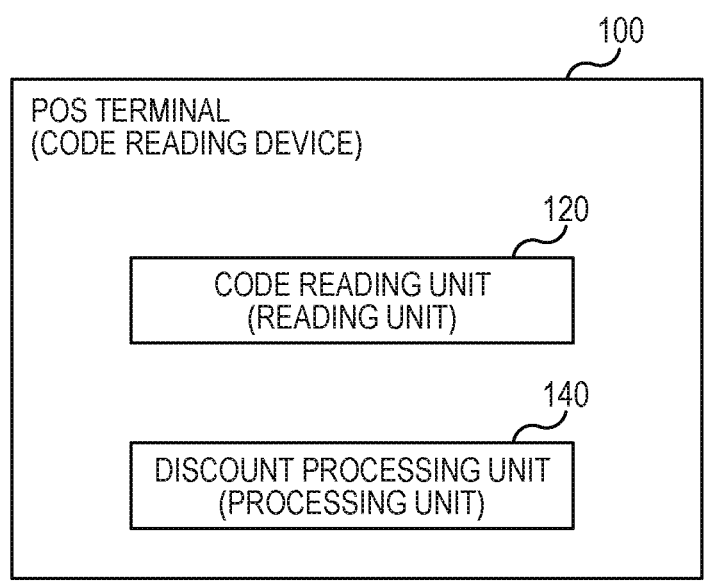
FIG. 17 is a schematic configuration diagram of a POS terminal according to each example embodiment.

FIG. 17 is a schematic configuration diagram of the POS terminal 100 according to each example embodiment described above. FIG. 17 illustrates a configuration example by which the POS terminal 100 functions as a code reading device that reads information of a code by irradiating a code attached to an item with lights of two different colors and makes a discount by detecting the presence of a discount line. The POS terminal 100 has a code reading unit 120 (reading unit) that reads information of the code based on a reflected light from a code attached to an item and a discount processing unit 140 (processing unit) that makes a discount of the item when the information of the code is not read by using a first light being irradiated on the code and the information of the code is read by using a second light being irradiated on the code. The second light is different from the first light. Further, the stationary type code scanner 10 illustrated in FIG. 4 may be configured as a code reading device.

The present invention is not limited to the example embodiments described above and can be properly changed within the scope not departing from the spirit of the present invention.

The scope of each of the example embodiments further includes a processing method that stores, in a storage medium, a program that causes the configuration of each of the example embodiments to operate so as to implement the function of each of the example embodiments described above (for example, a program that causes the POS terminal 100 to perform the process illustrated in FIG. 9A, FIG. 9B, FIG. 12, FIG. 14, and FIG. 15), reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a CD-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

A code reading device comprising:

a reading unit that reads information of a code based on a reflected light from the code attached to an item; and a processing unit that makes a discount of the item when the information of the code is not read by using a first light being irradiated on the code and the information of the code is read by using a second light being irradiated on the code, wherein the second light is different from the first light.

(Supplementary Note 2)

The code reading device according to supplementary note 1 further comprising a control unit that performs control to irradiate the code with either the first light or the second light.

(Supplementary Note 3)

The code reading device according to supplementary note 1 or 2 further comprising an acquisition unit that, based on the information of the code, acquires item information indicating whether or not the item is a subject of the discount, wherein the processing unit performs the discount when the information of the code is not read by using the first light being irradiated on the code, the information of the code is read by using the second light being irradiated on the code and it is indicated by the item information that the item is a subject of the discount.

(Supplementary Note 4)

The code reading device according to supplementary note 3, wherein the item information indicates whether or not the item is a subject of the discount by at least one of a discount rate, a discount price, and a price after the discount with respect to the item, and wherein the processing unit makes the discount by using at least one of the discount rate, the discount price, and the price after the discount.

(Supplementary Note 5)

The code reading device according to supplementary note 3, wherein the item information indicates whether or not the item is a subject of the discount on a time range basis, and wherein the processing unit makes the discount when the information of the code is not read by using the first light being irradiated on the code and the information of the code is read by using the second light being irradiated on the code and time of reading the code is included in the time range that is a subject of the discount.

(Supplementary Note 6)

The code reading device according to supplementary note 3, wherein the item information indicates whether or not the item is a subject of the discount by at least one of a discount rate, a discount price, and a price after the discount set on a time range basis with respect to the item, and wherein the processing unit makes the discount by using at least one of the discount rate, the discount price, and the price after the discount when the information of the code is not read by using the first light being irradiated on the code, the information of the code is read by using the second light being irradiated on the code and time of reading the code is included in the time range that is a subject of the discount.

(Supplementary Note 7)

The code reading device according to any one of supplementary notes 1 to 6, wherein the first light is any one of a red light, a blue light, a green light, and an intermediate color light, and the second light is a white light.

(Supplementary Note 8)

The code reading device according to any one of supplementary notes 1 to 6, wherein the first light is a first intermediate color light, and the second light is a second intermediate color light that is different from the first intermediate color light.

(Supplementary Note 9)

A code reading method comprising:

reading information of a code based on a reflected light from the code attached to an item; and making a discount of the item when the information of the code is not read by using a first light being irradiated on the code and the information of the code is read by using a second light being irradiated on the code, wherein the second light is different from the first light.

(Supplementary Note 10)

A code reading program that causes a computer to perform:

reading information of a code based on a reflected light from the code attached to an item; and making a discount of the item when the information of the code is not read by using a first light being irradiated on the code and the information of the code is read by using a second light being irradiated on the code, wherein the second light is different from the first light.

This application is based upon and claims the benefit of priority from Japanese Patent Application No. 2017-079512, filed on Apr. 13, 2017, the disclosure of which is incorporated herein in its entirety by reference.

REFERENCE SIGNS LIST

100 POS terminal
110 light color control unit
120 code reading unit
130 item information acquisition unit
140 discount processing unit

The invention claimed is:

1. A code reading device comprising:
a reader configured to read information of a code based on a reflection of light from the code attached to an item; and
a processor configured to:
control the reader to irradiate first light on the code attached to the item;
receive a first signal from the reader corresponding to the information of the code based on the reflection of the first light read by the reader;
determine whether the first signal satisfies a first criterion based on a first threshold voltage corresponding to the first light;
based on a determination that the first signal satisfies the first criterion, identify the item without a discount;
based on a determination that the first signal does not satisfies the first criterion:
control the reader to irradiate second light on the code attached to the item;
receive a second signal from the reader corresponding to the information of the code based on the reflection of the second light read by the reader;
determine whether the first signal satisfies a second criterion based on a second threshold voltage corresponding to the second light; and
based on a determination that the second signal satisfies the second criterion, identify the item with the discount,
wherein the second light is different from the first light.

2. The code reading device according to claim 1 wherein the processor is further configured to, based on the information of the code, acquire item information indicating whether or not the item is a subject of the discount.

3. The code reading device according to claim 2,
wherein the item information indicates whether or not the item is a subject of the discount by at least one of a discount rate, a discount price, and a price after the discount with respect to the item, and wherein the processor is further configured to identify the discount based on at least one of the discount rate, the discount price, and the price after the discount.

4. The code reading device according to claim 2, wherein the item information indicates whether or not the item is a subject of the discount on a time range basis.

5. The code reading device according to claim 2, wherein the item information indicates whether or not the item is a subject of the discount by at least one of a discount rate, a discount price, and a price after the discount set on a time range basis with respect to the item, and wherein the processor is further configured to identify the discount based on at least one of the discount rate, the discount price, and the price after the discount when the information of the code is not read by using the first light being irradiated on the code, the information of the code is read by using the second light being irradiated on the code and time of reading the code is included in the time range that is a subject of the discount.

6. The code reading device according to claim 1, wherein the first light is any one of a red light, a blue light, a green light, and an intermediate color light, and the second light is a white light.

7. The code reading device according to claim 1, wherein the first light is a first intermediate color light, and the second light is a second intermediate color light that is different from the first intermediate color light.

8. A code reading method comprising:
controlling a reader to irradiate first light on a code attached to an item;
receiving a first signal from the reader corresponding to information of the code based on reflection of the first light;
determining whether the first signal satisfies a first criterion based on a first threshold voltage corresponding to the first light;
based on a determination that the first signal satisfies the first criterion, identifying the item without a discount;
based on a determination that the first signal does not satisfies the first criterion:
controlling the reader to irradiate second light on the code attached to the item;
receiving a second signal from the reader corresponding to the information of the code based on the reflection of the second light read by the reader;
determining whether the first signal satisfies a second criterion based on a second threshold voltage corresponding to the second light; and
based on a determination that the second signal satisfies the second criterion, identifying the item with the discount,
wherein the second light is different from the first light.

9. A non-transitory computer readable storage medium in which a code reading program is stored, the code reading program that causes a computer to perform:
controlling a reader to irradiate first light on a code attached to an item;
receiving a first signal from the reader corresponding to information of the code based on reflection of the first light;
determining whether the first signal satisfies a first criterion based on a first threshold voltage corresponding to the first light;
based on a determination that the first signal satisfies the first criterion, identifying the item without a discount;
based on a determination that the first signal does not satisfies the first criterion:
controlling the reader to irradiate second light on the code attached to the item;
receiving a second signal from the reader corresponding to the information of the code based on the reflection of the second light read by the reader;
determining whether the first signal satisfies a second criterion based on a second threshold voltage corresponding to the second light; and
based on a determination that the second signal satisfies the second criterion, identifying the item with the discount,
wherein the second light is different from the first light.

* * * * *